UNITED STATES PATENT OFFICE 2,606,178

ALKALI SULFATE SALTS OF ETHYLENE OXIDE CONDENSATION PRODUCTS AS EMULSIFIERS FOR STYRENE POLYMERIZATION

Milton Kosmin, Dayton, Ohio, assignor to Monsanto Chemical Company, St. Louis, Mo., a corporation of Delaware No Drawing. Application June 18, 1949, Serial No. 100,095

13 Claims. (Cl. 260—93.5)

The present invention relates to improved emulsifiers for the manufacture of polystyrene by the emulsion polymerization process.

This novel class of styrene emulsifiers may be diagrammatically shown by the structural formula

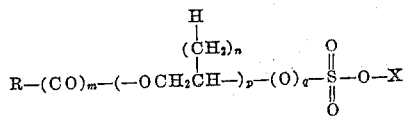

wherein: R is a hydrocarbon radical containing from 8 to 20 carbon atoms, inclusive, when $m=0$, and from 7 to 19 carbon atoms, inclusive, when $m=1$; $m$ is a whole number from 0–1; $n$ is a whole number from 0–1; $p$ is an integer from 1–30; $q$ is a whole number from 0–1; and X is an alkali metal.

Condensation reactions are generally defined as a union of like or unlike molecules, usually with elimination of for example one or more molecules of water, however the term is also used to define a union and combination of similar molecules to form a more complex compound. Whereas the polymerization of a hydrocarbon alcohol or acid with an alkylene oxide is not strictly speaking a condensation reaction it has often been loosely described as such in the literature. For this reason and to avoid confusion of the above type reaction with the polymerization of styrene the term "condensation" will be reserved for describing the reaction of a hydrocarbon alcohol or acid with an alkylene oxide and "polymerization" will be reserved for the conversion of styrene to polystyrene in the following specification.

The literature describes five general polymerization methods for the production of polystyrene: (1) treatment of the liquid monomer or mass polymerization, (2) treatment of the monomer in solution, (3) treatment of the monomer in suspension, (4) treatment of the monomer in emulsion, and (5) treatment of the monomer in the vapor phase.

The bulk of the polystyrene commercially produced is currently manufactured by the mass polymerization process. It is known that the rate of reaction in emulsion polymerization is much more rapid than in homogeneous systems; thus attempts have been made to utilize this property to lower the current production costs, but with little success since the advantages of more rapid polymerization are in general cancelled by the necessity of removing foreign materials such as the emulsifier from the polystyrene by coagulation and washing steps.

A good polymerization emulsifier requires high conversion of the monomer to the polymer with little or no formation of coagulate at low emulsifier concentrations. Also the emulsifier must be compatible with the polystyrene and not deleteriously affect the chemical and physical properties of the final product. In the case of polystyrene the molding properties and appearance are of particular importance since these properties, along with low water absorption, high dimensional stability, high dielectric quality, etc., are largely responsible for the rapid increase in production of this plastic from a new material to over 100,000,000 pounds per year in the short time of a little more than ten years.

Emulsion polymerization per se is old, but in general the available emulsifiers practical with styrene are somewhat limited. This is occasioned by the fact that polystyrene has an extremely high transparency and is colorless thus many otherwise useful emulsifiers may result in a hazy or colored product if the emulsifiers were not subsequently removed. Since the colorless polystyrene commands a premium price, it is desirable to be able to economically manufacture this grade of material as run of the mill production rather than requiring special processing. Generally the emulsifier and other impurities of the prior art are required to be removed by coagulation and washing of the polystyrene followed by drying.

The principal object of this invention is an improved process for emulsion polymerization of styrene embodying the use of an improved class of emulsifiers.

Another object is the emulsion polymerization of styrene to directly yield polystyrene of good physical and chemical properties without requiring coagulation and washing of the polystyrene.

A further object is the production of polystyrene molding material of improved heat resistance, flexural strength, tensile strength, and toughness.

Other objects will be apparent from the following disclosure.

Non-ionic emulsifiers are generally compatible with polystyrene but show poor emulsifier activity. Prior art anionic emulsifiers usually show good activity but compatibility varies from excellent to poor. Cationic emulsifiers may give good conversion but tend to produce bad lumping with subsequent loss of product.

It has now been found that the condensation of alkylene oxides such as ethylene oxide or propylene oxide with hydrocarbon acids or alcohols or mixtures thereof containing from about 8 to about 20 carbon atoms with subsequent sulfation or sulfonation and neutralization to form the alkali metal salts thereof results in a novel styrene anionic emulsifier which is compatible with polystyrene and has excellent activity, giving conversions greater than 99 percent.

The use of the novel process disclosed herein may be advantageously employed in the emulsion polymerization of styrene wherein the polymer is not subsequently coagulated and washed. The emulsion polymerization product may be dried directly and milled for use without the novel emulsifier imparting any undesirable properties to the polystyrene molding compound. The molded product made from this polystyrene has greater heat resistance, flexural strength, tensile strength, and toughness than the molded product from mass polymerized polystyrene. The molecular weight of the polystyrene product is of the same order in both the emulsion polymerization and mass polymerization processes, thus exhibiting similar desirable molding properties.

The readily available, abundant, relatively cheap natural sources of hydrocarbon acids and alcohols such as tall oil, "Lorol" and hydroabietyl alcohol are well suited as the basic raw material for the production of the emulsifier of the disclosed novel process. These materials may be condensed with from about one to about 30 mols and preferably from about one to about 15 mols of alkylene oxides such as ethylene oxide or propylene oxide with subsequent conversion to the sulfated or sulfonated product and neutralization of same to produce the alkali metal salts thereof.

The above type materials are described in the prior art, but their use as emulsifiers for polystyrene has now been found to be unexpectedly good.

Tall oil is available in several grades, all of which are suitable for conversion to styrene emulsifiers. However, the crude material imparts a slight color to the molded product and is therefore suitable primarily for colored products of polystyrene where it is entirely acceptable. Crude tall oil is composed of 45 to 55 percent fatty acids which are primarily equal amounts of linoleic and oleic acids with a small content of saturated acids which is predominantly palmitic acid, rosin or resin acids 40 to 45 percent which is predominantly abietic acid, and 6 to 10 percent sterols. The refined tall oil will run considerably higher in the fatty acids at the expense of the resin acids, it being possible to obtain products containing below 9 percent resin acids, but since these materials command a premium price, it is generally not necessary to use this high grade material since the less highly refined product gives excellent results.

"Lorol" is a natural mixture of aliphatic alcohols derived from coconut oil fatty acids and is principally lauryl alcohol with decreasing percentages of n-tetradecyl, n-hexadecyl, n-decyl, n-octyl and other alcohols in small amounts.

Hydroabietyl alcohol is commercially available in large quantities and has an average composition of about 13 percent dehydroabietyl alcohol, 34 percent dihydroabietyl alcohol, 38 percent tetrahydroabietyl alcohol, and 15 percent non-alcoholic proportion (about 6 percent ester and the remaining 9 percent is similar to the hydrocarbon fractions occurring in hydrogenated rosin).

Obviously individual acids and alcohols containing from 8 to 20 carbon atoms also may be employed as the base material for the production of the emulsifier; the above raw materials being specifically stressed because of their potential abundance.

Examples of acids which may be used are as follows: caprylic, nonylic, capric, undecylic, lauric, tridecylic, myristic, pentadecylic, palmitic, margaric, stearic, nonadecylic, arachidic, 2-ethylhexoic, undecylenic, palmitoleic, oleic, linoleic, linolenic, stearolic, toluic, phenylacetic, cinnamic, naphthoic, anthroic, abietic, dehydroabietic, dihydroabietic, tetrahydroabietic, etc. Alcohols of the aforementioned acids are also illustrative of the scope of compounds potentially suitable as emulsifiers for the polymerization of styrene.

The reaction of the hydrocarbon acids with ethylene oxide with subsequent sulfation and neutralization for the production of these emulsifiers may be diagrammatically shown as follows:

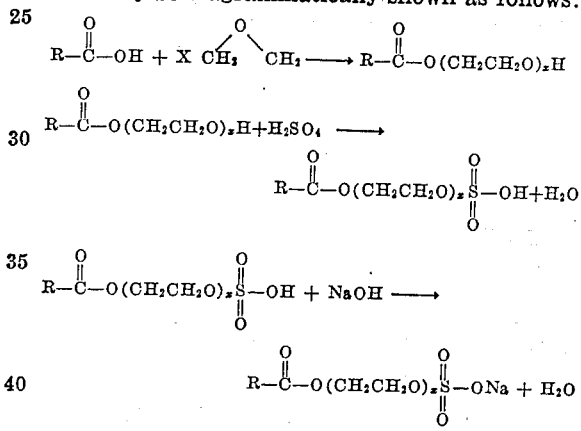

wherein R is a 7-19 carbon atom hydrocarbon radical and X is an integer from one to 30. The alcohols undergo a similar series of reactions.

While the herein disclosed emulsion polymerization product may be dried directly and packaged, it is, of course, also understood that the usual methods of coagulation such as freezing, precipitating in alcohol, treatment with various materials such as alkali metal salts of inorganic or organic acids, for example sodium, potassium or ammonium-halides, carbonates, sulfates, nitrates, phosphates, acetates; and salts of polyvalent metals may be employed as desired.

Having now briefly disclosed the novel emulsifiers for emulsion polymerization of styrene the following examples are submitted as illustrative of the invention:

*Example 1*

To 223.3 grams (0.74 mol) of crude tall oil and 2.9 grams of powdered potassium hydroxide contained in the sealed reactor which had been flushed with nitrogen was introduced 166.0 grams of ethylene oxide and condensed at 150° C.-155° C. over a period of 4.5 hours. Assuming the average molecular weight of crude tall oil to be 300 the resulting polyoxyalkylether condensation product contained 5.07 mols of ethylene oxide per mol of tall oil.

To 100 grams of the above condensation product, cooled in ice-water, 80 grams of 100 percent sulfuric acid was added in small portions, then the mixture was stirred for 3.5 hours at 30° C.-35° C, after which it was poured onto 300 grams of Dry Ice and allowed to stand overnight. In the morning the mass was neutralized in alcohol and filtered, the filtrate being recovered and drum dried to be tested as an emulsifier in the emulsion polymerization of styrene.

Three-fourths gram (0.5 percent basis of styrene) of the above emulsifier was dissolved in a flask charge of 375 grams of distilled water and transferred to a one-liter, three-necked flask equipped with a Trubore stirrer, reflux condenser, thermometer, and calibrated dropping funnel. Using a Glascol heating mantel connected through a Variac for temperature control, the charge was heated to mild reflux, from about 98° C.–100° C., and 150 grams of styrene monomer added at a uniform rate during a one hour period. An additional 0.5 hour at mild reflux was used as a finishing period.

The catalyst solution was made up by dissolving 4 grams of potassium peroxydisulfate, more commonly called potassium persulfate, in 380 grams of water to which 16.4 mls. of 5 percent sodium hydroxide had been added to give a one percent solution of catalyst containing 0.35 mol of sodium hydroxide per mol of potassium persulfate. A total of 15 mls. of the aforementioned catalyst solution was added in 2.5 ml. portions at 15 minute intervals to give final concentrations of 0.1 percent catalyst and 0.02 percent sodium hydroxide on the styrene charge.

The final emulsion was steam-distilled to determine the conversion by quantitative estimation of the unreacted monomer in the distillate, poured through a 16 mesh screen to collect lumps, and then direct-dried in a 0.5 inch layer in a Proctor and Schwartz circulating air oven at 80° C.–85° C. overnight. A sample of the final emulsion was saved for a pH determination which was found to be 7.62. The conversion in the above example was found to be 99.4 percent and the lumps were approximately 3.3 percent. The compatibility of the emulsifier with the polystyrene as demonstrated by a disc molding was found to be good. The color of the disc when viewed through a transverse section was found to be slightly yellow.

A similar condensation product of one mol of crude tall oil with 5 mols of ethylene oxide, but not converted to either the alkali metal sulfate or sulfonate, when tested at the same emulsifier concentration and under similar conditions, was found to give a conversion of only 38.7 percent.

*Example 2*

A similar condensation product to that of Example 1 was prepared by reacting one mol of refined tall oil with 5 mols of ethylene oxide with subsequent sulfation and neutralization with sodium hydroxide. Twenty-seven-hundredths gram (0.18 percent on the basis of styrene) of this emulsifier was tested in a similar manner to that related in Example 1. The conversion was found to be 99.3 percent with a lump loss of 3.5 percent. The disc molding compatibility was found to be excellent and the molded discs had only a very slight yellow tint when viewed in the transverse section. The emulsion pH was 8.90.

*Example 3*

To 166.5 grams of "Lorol" (0.895 mol assuming an average molecular weight of 186) and 1.7 grams of potassium hydroxide in the reactor was introduced 196.9 grams of ethylene oxide with heating at 155° C.–160° C. over a four year period. The polyoxyalkylether condenser product had a mol ratio of "Lorol" to ethylene oxide of 1:5.

Sixty-eight grams of the above material was added slowly to 25.1 grams of 100 percent sulfuric acid in a flask held in a cold-water bath. After all the "Lorol"-ethylene oxide condensation product had been added the temperature of of the mass was maintained at 25° C.–30° C. with stirring. The mass was found to be completely water soluble after 10 minutes. Stirring was continued for one hour, then the mass was allowed to stand for 40 minutes at 25° C. and then 10 mls. of water was slowly added, after which the sulfated condensation product was dissolved in absolute ethanol, neutralized with 40 percent sodium hydroxide solution, filtered, and the ethanol removed from the filtrate under water pump vacuum. The emulsifier product was further treated by placing under a heat lamp and finally dried in the vacuum oven for 24 hours at 50° C. to remove the last traces of ethanol. The weight of the emulsifier material was 88.9 grams.

The emulsifier was evaluated with the identical procedure related in Example 1 above. The conversion was found to be 99.2 percent, lump loss 3.8 percent, pH 9.42, disc molding compatibility was excellent and the color of the disc molding was almost water white.

A similar evaluation was made on the non-sulfated "Lorol"-ethylene oxide condensation product with the exception that the emulsifer was split between the water phase (0.50 gram) and the monomer (0.25 gram). The conversion was found to be only 35.4 percent.

*Example 4*

To 290.0 grams of technical hydroabietyl alcohol (one mol assuming an average molecular weight of 290) and 2.9 grams of potassium hydroxide was rapidly introduced 220.0 grams of ethylene oxide. The reaction was continued over a total period of 4.5 hours during which time the temperature ranged from 110° C.–160° C. The hydroabietyl alcohol-ethylene oxide condensation product had a mol ratio of 1:5.

To 100.0 grams of the above condensation product and 300 grams of carbon tetrachloride, which had been dried over anhydrous calcium sulfate, in a 500 ml. round bottom flask fitted with a thermometer, stirrer, and dropping funnel, 80.0 grams of 100 percent sulfuric acid was slowly added, the temperature being held below 30° C. by an ice-water bath. The mass was stirred for 4.5 hours at 35° C., stood overnight and then 20 mls. of water slowly added. The mass was transferred to a beaker and approximately 500 mls. of ethanol added, the solution was then neutralized with 40 percent sodium hydroxide solution and filtered. The emulsifier was dried in a vacuum oven at 70° C. and 97.3 grams of material recovered.

The emulsifier was tested by the method related in Example 1 with the exception that only 0.27 gram (0.18 percent) of emulsifier was employed. The conversion was found to be 99.3 percent, lump loss 2.9 percent, pH 8.60, disc molding compatibility was excellent, and the color of the disc molding was only very slightly yellow.

*Example 5*

To 178.0 grams (0.66 mol) of n-octadecylalcohol and 1.8 grams of powdered potassium hydroxide was added 144.9 grams of ethylene oxide over a period of 1.5 hours at 160° C.–165° C. The n-octadecylalcohol-ethylene oxide condensation product had a mol ratio of 1:5.

To 51.5 grams of the above condensation product and 150 mls. of dry carbon tetrachloride, 15.8 grams of 100 percent sulfuric acid was slowly added with stirring, the temperature being kept below 30° C. by an ice-water bath. Stirring was continued for two hours at 30° C., then the mass was cooled and 10 mls. of water added, after which the solution was diluted with absolute ethanol, neutralized with 40 percent sodium hydroxide solution and the solvents evaporated.

The emulsifier was tested by the method related in Example 1 with the exception that the emulsion polymerization temperature was allowed to range from about 97° C. to about 100° C. The conversion was found to be 99.5 percent, lump loss 2.9 percent, pH 8.85, disc molding compatibility was good, and the color of the disc molding was almost water white.

Whereas the novel styrene emulsifiers disclosed herein have been utilized in the process of Example 1 for the production of polystyrene by the emulsion polymerization process, it should be understood that the emulsifier is suitable over a wide range of emulsion polymerization conditions. For example, the pH may be varied from about 3 to about 10. The emulsifier concentration may be varied from about 0.1 percent to about 5 percent on the basis of the styrene. The temperature may be varied from about 40° C.–150° C. preferably with an inert atmosphere such as nitrogen supplied when other than refluxing conditions are employed, however it is obvious to those skilled in the art that in general the rate of polymerization varies directly as the temperature and the molecular weight of the polymer varies inversely as the temperature, therefore these factors must be compromised, in general it being preferable to conduct the polymerization at reflux temperature. Other catalysts such as hydrogen peroxide, tert.-butyl-hydroperoxide, benzoyl peroxide, sodium perborate, etc. may be employed. The weight ratio of styrene to water employed has been varied from about 0.1 to about 1.0, but the preferred range is from about 0.4 to about 0.5. Thus generally speaking the emulsion polymerization conditions of the prior art may be employed with the novel styrene emulsifier disclosed herein.

Whereas the preferred embodiment of the invention wherein a ratio of one mol alcohol and/or acid to 5 mols ethylene oxide is illustrated in the foregoing examples it should be understood that other mol ratios ranging from 1:1 to 1:30 may be employed. The proper degree of water-solubility for optimum emulsifying properties begins to be exceeded above about 30 mols of the alkylene oxide and it is therefore preferred that this limit not be exceeded. Also above this limit the condensation reaction slows down thus making the production of emulsifiers more difficult.

The terms "sulfonate" and "sulfate" are often loosely used in the chemical literature. The present invention while directed primarily to the sulfated products is equally applicable to the sulfonated products. Sulfuric, sulfamic, sulfonic, chlorosulfonic, etc. acids may be employed to obtain the desired emulsifier for the emulsion polymerization of styrene disclosed herein. It should thus be understood that the sulfonate and sulfate members of the sulfoxy group are considered to be equivalent in this disclosure and within the scope of this invention.

The sulfated or sulfonated oxyalkylether may be neutralized with sodium, potassium, ammonium hydroxides, etc. and the term "alkali metal" thus includes the ammonium radical.

Whereas the term "lump loss" is used in the foregoing examples as a measure of emulsifier suitability, it should be understood that this material is not discarded as it may be reprocessed and utilized, however it is desirable to maintain the "lump loss" at a low level to avoid additional processing.

In carrying out the herein disclosed emulsion polymerization process it is preferable that the processing equipment be glass-lined or of stainless steel in order to avoid contamination with possible resultant color of the polystyrene product.

It has been found that strain-free molded articles fabricated from the emulsion polymerized polystyrene are resistant to boiling water, thus the product is suited for the molding of household dinnerware, kitchen utensils, etc., which are periodically subject to hot water for short periods of time. The polystyrene may be used in the numerous applications of the prior art such as instrument parts and panels, wire covering, radio insulation, refrigerator parts, lighting fixtures, toys, coatings, costume jewelry, medical equipment, packaging foil, toilet articles, etc.

While various specific examples of preferred compositions and processes embodying the present invention have been described above, it will be apparent to those skilled in the art that many changes and modifications may be made in the methods of procedure, and that a wide variety of specific emulsifiers may be employed in carrying out the emulsion polymerization process. Therefore it should be understood that the examples cited and the particular proportions and methods of procedure set forth above are intended to be illustrative only, and are not intended to limit the scope of the invention.

I claim:

1. The process of emulsion of polymerization of styrene wherein the emulsifier is represented by the formula

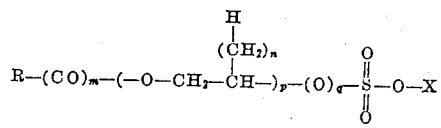

wherein R is a hydrocarbon radical containing from 8 minus $m$ to 20 minus $m$ carbon atoms, inclusive, $m$ is a whole number from 0–1, $n$ is a whole number from 0–1, $p$ is an integer from 1–30, $q$ is a whole number from 0–1, and X is an alkali metal, comprising introducing from about 0.1 percent to about 5 percent, on the basis of the styrene, of said emulsifier into an amount of water between a weight ratio of styrene to water of about 0.1 and about 1.0, containing a polymerization catalyst, heating the emulsion between about 40° C. to about 150° C. to accelerate the polymerization of styrene to polystyrene, and then drying the emulsion to directly recover the polystyrene.

2. The process of claim 1 wherein R is the hydrocarbon radicals of tall oil and $m$ is 1.

3. The process of claim 1 wherein R is the hydrocarbon radicals of a natural mixture of aliphatic alcohols derived from coconut oil fatty acids and $m$ is O.

4. The process of claim 1 wherein R is the hydrocarbon radicals of hydroabietyl alcohol and $m$ is O.

5. The process of claim 1 wherein R is the n-octadecyl radical and $m$ is O.

6. The process of emulsion polymerization of styrene wherein the emulsifier is the sodium sulfate salt of the condensation product produced by reacting one mol of tall oil with 5 mols of ethylene oxide comprising introducing from about 0.1 percent to about 5 percent, on the basis of the styrene, of said emulsifier into an amount of water between a weight ratio of styrene to water of about 0.1 and about 1.0, containing a polymerization catalyst, heating the emulsion between about 40° C. to about 150° C. to accelerate the polymerization of styrene to polystyrene, and then drying the emulsion to directly recover the polystyrene.

7. The process of emulsion polymerization of styrene wherein the emulsifier is the sodium sulfate salt of the condensation product produced by reacting one mol of a natural mixture of aliphatic alcohols derived from coconut oil fatty acids with 5 mols of ethylene oxide comprising introducing from about 0.1 percent to about 5 percent, on the basis of the styrene, of said emulsifier into an amount of water between a weight ratio of styrene to water of about 0.1 and 1.0, containing a polymerization catalyst, heating the emulsion between about 40° C. to about 150° C. to accelerate the polymerization of styrene to polystyrene, and then drying the emulsion to directly recover the polystyrene.

8. The process of emulsion polymerization of styrene wherein the emulsifier is the sodium sulfate salt of the condensation product produced by reacting one mol of hydroabietyl alcohol with 5 mols of ethylene oxide comprising introducing from about 0.1 percent to about 5 percent, on the basis of the styrene, of said emulsifier into an amount of water between a weight ratio of styrene to water of about 0.1 and about 1.0, containing a polymerization catalyst, heating the emulsion between about 40° C. to about 150° C. to accelerate the polymerization of styrene to polystyrene, and then drying the emulsion to directly recover the polystyrene.

9. The process of emulsion polymerization of styrene wherein the emulsifier is the sodium sulfate salt of the condensation product produced by reacting one mol of tall oil with 5 mols of ethylene oxide comprising introducing from about 0.1 percent to about 5 percent, on the basis of the styrene, of said emulsifier into an amount of water between a weight ratio of styrene to water of about 0.4 and about 0.5, containing a polymerization catalyst, heating the emulsion at reflux temperature to accelerate the polymerization of styrene to polystyrene, and then drying the emulsion to directly recover the polystyrene.

10. The process of emulsion polymerization of styrene wherein the emulsifier is the sodium sulfate salt of the condensation product produced by reacting one mol of a natural mixture of aliphatic alcohols derived from coconut oil fatty acids with 5 mols of ethylene oxide comprising introducing from about 0.1 percent to about 5 percent, on the basis of the styrene, of said emulsifier into an amount of water between a weight ratio of styrene to water of about 0.4 and about 0.5, containing a polymerization catalyst, heating the emulsion at reflux temperature to accelerate the polymerization of styrene to polystyrene, and then drying the emulsion to directly recover the polystyrene.

11. The process of emulsion polymerization of styrene wherein the emulsifier is the sodium sulfate salt of the condensation product produced by reacting one mol of hydroabietyl alcohol with 5 mols of ethylene oxide comprising introducing from about 0.1 percent to about 5 percent, on the basis of the styrene, of said emulsifier into an amount of water between a weight ratio of styrene to water of about 0.4 and about 0.5, containing a polymerization catalyst, heating the emulsion at reflux temperature to accelerate the polymerization of styrene to polystyrene, and then drying the emulsion to directly recover the polystyrene.

12. The process of emulsion polymerization of styrene wherein the emulsifier is the sodium sulfate salt of the condensation product produced by reacting one mol of n-octadecyl alcohol with 5 mols of ethylene oxide comprising introducing from about 0.1 percent to about 5 percent, on the basis of styrene, of said emulsifier into an amount of water between a weight ratio of styrene to water of about 0.1 and about 1.0, containing a polymerization catalyst, heating the emulsion between about 40° C. to about 150° C. to accelerate the polymerization of styrene to polystyrene, and then drying the emulsion to directly recover the polystyrene.

13. The process of emulsion polymerization of styrene wherein the emulsifier is the sodium sulfate salt of the condensation product produced by reacting one mol of n-octadecyl alcohol with 5 mols of ethylene oxide comprising introducing from about 0.1 percent to about 5 percent, on the basis of the styrene, of said emulsifier into an amount of water between a weight ratio of styrene to water of about 0.4 and about 0.5, containing a polymerization catalyst, heating the emulsion at reflux temperature to accelerate the polymerization of styrene to polystyrene, and then drying the emulsion to directly recover the polystyrene.

MILTON KOSMIN.

REFERENCES CITED

The following references are of record in the file of this patent:

UNITED STATES PATENTS

| Number | Name | Date |
| --- | --- | --- |
| 2,227,163 | Starck | Dec. 31, 1940 |
| 2,479,226 | George | Aug. 16, 1949 |

FOREIGN PATENTS

| Number | Country | Date |
| --- | --- | --- |
| 380,431 | Great Britain | Sept. 12, 1932 |